(12) United States Patent
Hunt et al.

(10) Patent No.: US 7,730,995 B2
(45) Date of Patent: Jun. 8, 2010

(54) ACOUSTIC APPARATUS

(75) Inventors: Graeme Clive Hunt, Nottingham (GB); Zahid Muhammed Hussain, Derby (GB); Brian Alex Handley, Derby (GB)

(73) Assignee: Rolls-Royce PLC, London (GB)

( * ) Notice: Subject to any disclaimer, the term of this patent is extended or adjusted under 35 U.S.C. 154(b) by 22 days.

(21) Appl. No.: 11/876,001

(22) Filed: Oct. 22, 2007

(65) Prior Publication Data
US 2008/0179132 A1 Jul. 31, 2008

(30) Foreign Application Priority Data
Nov. 2, 2006 (GB) .................................. 0621779.8

(51) Int. Cl.
*F02K 1/82* (2006.01)
(52) U.S. Cl. .................... 181/213; 181/210; 181/224; 181/237; 415/119; 415/144; 244/1 N; 60/782; 60/785
(58) Field of Classification Search ................. 181/210, 181/213, 224, 225, 237; 415/119, 144; 244/1 N; 60/782, 785
See application file for complete search history.

(56) References Cited

U.S. PATENT DOCUMENTS

| | | | | |
|---|---|---|---|---|
| 4,113,050 A | | 9/1978 | Smith | |
| 4,381,017 A | * | 4/1983 | Bissinger | .................... 137/15.1 |
| 4,537,277 A | * | 8/1985 | Bryce | .......................... 181/214 |
| 4,762,540 A | | 8/1988 | Ruiz et al. | |
| 5,060,471 A | * | 10/1991 | Torkelson | ..................... 60/262 |
| 5,266,754 A | | 11/1993 | Swift | |
| 5,351,478 A | * | 10/1994 | Walker et al. | .................. 60/785 |
| 5,934,611 A | * | 8/1999 | Tindell et al. | ............. 244/53 B |
| 6,457,676 B1 | * | 10/2002 | Breer et al. | ............. 244/134 R |
| 6,588,195 B2 | * | 7/2003 | Negulescu | ..................... 60/785 |
| 2006/0059916 A1 | * | 3/2006 | Cheung et al. | ................. 60/752 |
| 2006/0219475 A1 | * | 10/2006 | Olsen et al. | .................. 181/214 |

FOREIGN PATENT DOCUMENTS

| | | |
|---|---|---|
| GB | 2132269 | 7/1984 |
| GB | 2405666 | 3/2005 |
| WO | 03046358 A1 | 6/2003 |

\* cited by examiner

Primary Examiner—Jeffrey Donels
Assistant Examiner—Jeremy Luks
(74) Attorney, Agent, or Firm—McCormick, Paulding & Huber LLP

(57) ABSTRACT

Acoustic noise from relatively high pressure gas flows as a result of opening for example a bypass valve in a gas turbine engine can cause problems. By provision of an acoustic apparatus incorporating an inner chamber where there is a pressure reduction and then a chamber divider surface incorporating small apertures with a wide spacing distribution an upward shift in acoustic frequency of the gas flow is achieved beyond normal human comprehension. An outer chamber is provided to receive the fine gas flow jets from the apertures in the chamber divider surface for further pressure reduction and low pressure release through wider apertures in an exit surface.

13 Claims, 4 Drawing Sheets

ACOUSTIC APPARATUS

CROSS-REFERENCE TO RELATED APPLICATION

This application is entitled to the benefit of British Patent Application No. GB 0621779.8 filed on Nov. 2, 2006.

FIELD OF THE INVENTION

The present invention relates to acoustic apparatus and more particularly to acoustic apparatus utilized in gas turbine engines with regard to bypass valves in order to moderate the acoustic impingement of high pressure gas flows through the bypass valve.

BACKGROUND OF THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low-pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts 26, 27, 28.

From the above it will be appreciated that control of gas flows through a gas turbine engine is important in terms of achieving operational efficiency.

In such circumstances in order to avoid surging it is known to provide bleed valves which essentially allow when required. FIG. 2 provides a schematic side view of part of a prior gas turbine engine in which a bypass flow 30 is presented about a fairing 31 which surrounds an engine core including an intermediate pressure compressor stage 32 and a high pressure compressor stage 33. In use the gas flow pressure generated by the compressors 32, 33 acts with a combustor 34 in order to generate thrust. The casing 31 incorporates acoustic material 35 upon an outer surface with ducts 36 extending from an inner end adjacent to a respective compressor 32, 33 stage to an outer surface formed by a noise attenuation silencer 37 which is generally substantially contiguous with an outer surface 38 of the casing 31.

The inner end of the ducts 36 generally incorporates a bleed valve 39 which, as indicated, can modulate core mass flow from the compressors 32, 33 generally taken from vents 40.

It will be noted that the noise attenuation silencers are mounted with seals 41 and the acoustic material 35 generally secured appropriately through the groove or other association 42 with the diaphragm 41a.

In the known acoustic apparatus depicted in FIG. 2, it will be understood that the valves 39 generally are located within the duct 36 and the duct 36 terminated by the silencer 37. The silencer 37 is a porous structure with small holes operating at super critical pressure ratios in order to attempt to increase the characteristic acoustic frequency of a gas flow 43 passing through the valve 39 to a frequency less critical to the human ear. Placing the flow 42, 43 acoustic frequency at a higher frequency range will also allow more effective attenuation by acoustic liners within an engine and through atmospheric acoustic attenuation. It will also be appreciated that the silencers 37 mitigate the consequences of releasing hot gases by inducing increased mixing and flow deflection in the bypass flow 30.

Prior arrangements have not been perceived as fully able to mitigate the impact of hot gas release into the flow 30 to high exit temperatures and high exit velocities through the silencer 37. It will also be understood that the silencer 37 is a single stage approach without secondary protection should the silencer 37 fail. It will also be understood that the silencer 37 is generally a single porous plate, that is to say a plate with a distribution of apertures of a desired size and spacing and so the silencer 37 generally does not maximise acoustic treatment of the flow 43 due to variations in flow rate which in turn results in the silencers 37 being prone to failure as a result of large and varying pressure loads. It will also be noted that respective ducts 36 are required for valves 39 associated with respective intermediate and high pressure stages resulting in duplication which adds considerably to weight, cost and maintainability. The ducts are generally cylindrical sleeves or tubes causing direct impingement from the gas flow source, that is to say the valve upon the silencer exit surface with apertures.

SUMMARY OF THE INVENTION

In accordance with aspects of the present invention there is provided an acoustic apparatus for a high pressure gas flow, the apparatus comprising an exit surface with apertures to cause frequency shift in use in audible noise from a high pressure gas flow presented through a duct, the apparatus characterized in that the duct has an inner chamber and an outer chamber, the inner chamber associated with a high pressure gas flow source and configured to reduce an exit pressure from the high pressure gas flow sources, the outer chamber arranged downstream of the inner chamber with a chamber surface between them, the chamber surface incorporating an aperture distribution to provide a shift in acoustic frequency of the gas flow in use and the outer chamber having the exit surface or opening and configured to operate as an acoustic absorber for noise generated by flow prior to the gas flow passing through the exit surface.

Possibly, the outer chamber incorporating baffles to provide further acoustic variation. Typically, the apparatus is integrally formed with or within a casing. Generally, the apparatus comprises a trough circumferentially extending about the casing. Generally, the trough extends between bifurcations in the casing in an arc.

Typically, the source of gas flow comprises a valve. Possibly, the valve is a bleed valve in a gas turbine engine. Possibly, the inner chamber is segmented to provide a source of gas flow in each segment. Alternatively, the inner chamber is not segmented and is associated with more than one source of gas flow.

Typically, the exit surface has a relatively high porosity compared to a relatively low porosity for the chamber surface 54. Generally, the chamber surface has apertures having a size in the range 0.2-1.2 millimeters. Possibly, the chamber surface has apertures in a distribution in the order to achieve a porosity of up to 10% by area and preferably 2 to 4% porosity.

Possibly, the outer chamber surface 55 has apertures angled to provide an extended flow length before impingement attachment with the exit bypass surface.

Possibly, the outer chamber is segmented axially.

Possibly, the exit surface and the outer chamber are configured to perform as an acoustic attenuator for noise generated in stream.

Possibly, there is a further chamber between the inner and outer chambers.

Also in accordance with aspects of the present invention there is provided a gas turbine engine incorporating an acoustic apparatus in accordance with aspects of the present invention.

BRIEF DESCRIPTION OF THE DRAWINGS

Referring to FIG. 3, as previously, a gas turbine engine is utilized in order to illustrate an acoustic apparatus in accordance with aspects of the present invention. Similar nomenclature is utilized for correspondence between FIGS. 2 and 3 where appropriate. Thus, an intermediate pressure compressor 32 and a high pressure compressor 33 are arranged with respective valves 49a, 49b with a diaphragm 50 to separate high pressure and intermediate pressure gas bleed valves through the respective valves 49a, 49b. As previously, the gas flow, typically air from the compressors 32, 33 is associated with a combustor 34 in order to generate thrust.

Acoustic panels 35 are provided within a casing 31. In FIG. 2, the panels 35 are secured through seals and mountings 42 with a duct 36. This duct 36 is now replaced by an integral trough 51 (FIG. 3), which extends in an arc about the casing 31 in order to present an inner chamber 52 and an outer chamber 53. The inner chamber 52 and outer chamber 53 are separated by a chamber surface 54, which acts as a divider with a low porosity relative to an exit surface 55 which may include wide apertures or be a simple opening. The outer chamber 53 generally incorporates baffles 56, as will be described later, to further vary acoustic characteristics of an acoustic apparatus in accordance with aspects of the present invention.

Figure 1:
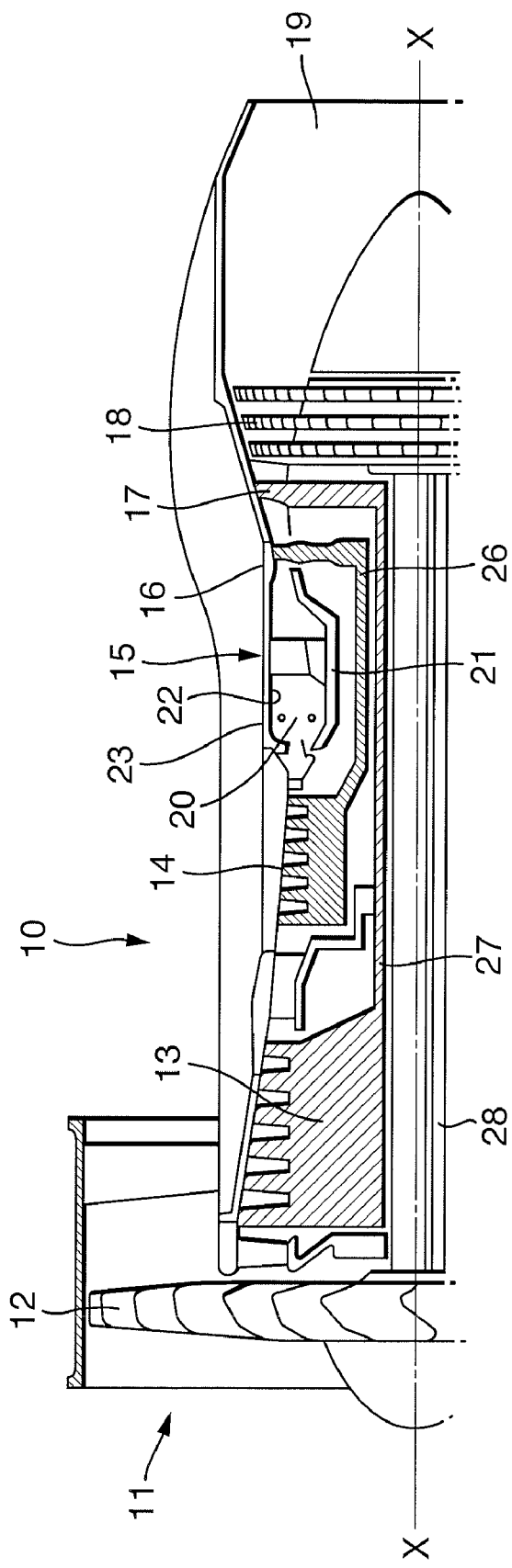
FIG. 1 is a simplified schematic illustration of a gas turbine engine partially in section.

The valves 49a, 49b are formed in an internal surface 57 of the casing 61. As described previously, the valves 49 act as sources of high pressure gas flow in accordance with aspects of the present invention. This high pressure gas flow is taken from the compressors 32, 33 in order to modulate core mass flow. It will be understood that these high pressure gas flows through the valves 49a, 49b will cause high audible noise levels when operated which will be detrimental to environmental acceptability.

Figure 2:
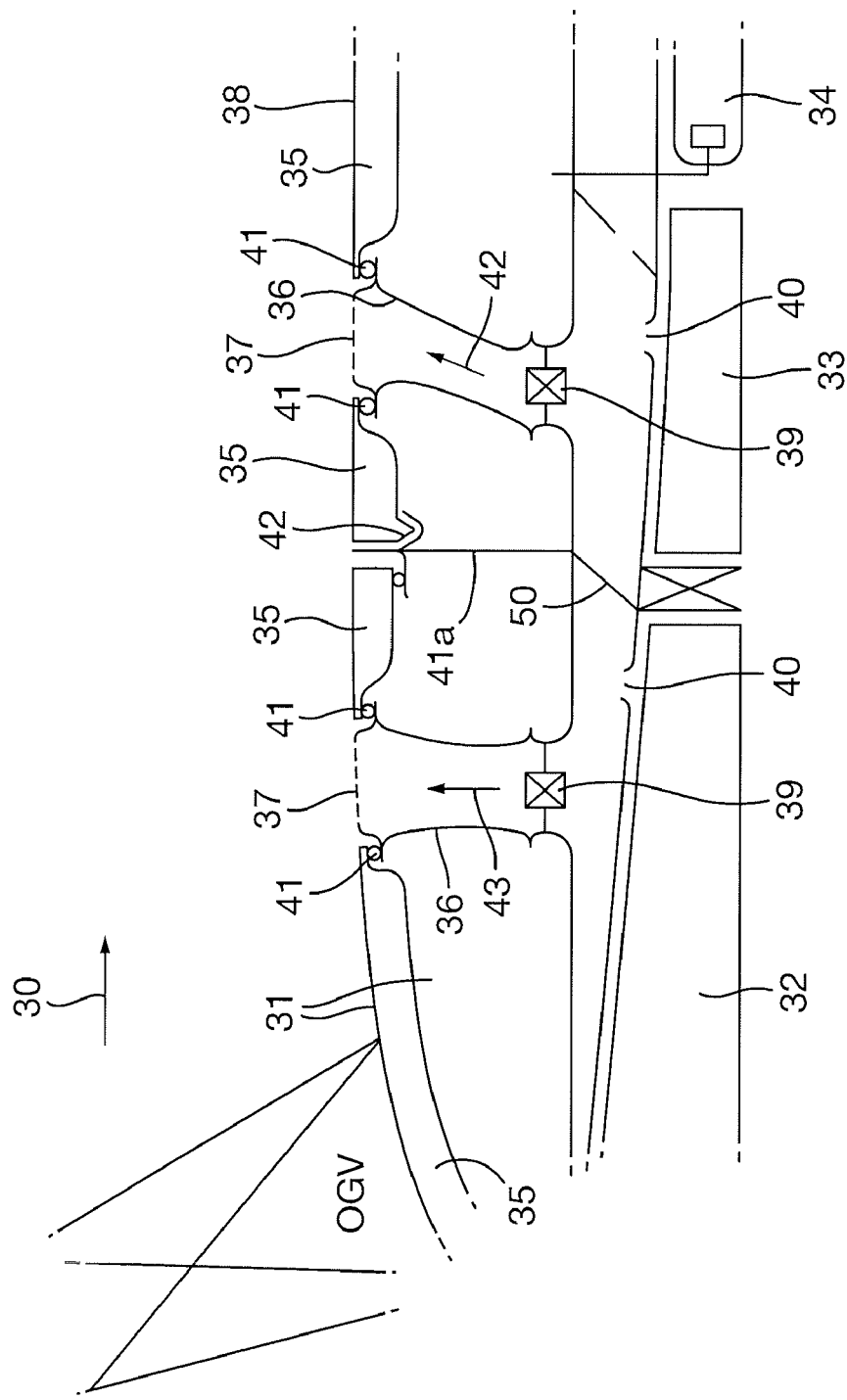
FIG. 2 is a simplified schematic side illustration of a portion of the gas turbine engine of FIG. 1.

Aspects of the present invention provide for the acoustic apparatus to be integrally formed with the casing 61 although, as will be described later, arrangements in accordance with aspects of the present invention could be used in other situations and associated with other casings dependent upon engine configuration. By integration, it will be appreciated that provision of separate ducts (see FIG. 2) with prior arrangements is avoided. The duct 51 in accordance with aspects of the present invention comprises a circumferential trough cast or machined into the casing 31 and arranged to provide the chambers 52, 53. The duct 51 provides a plenum chamber which extends for an arc about the circumference of the casing.

Figure 3:
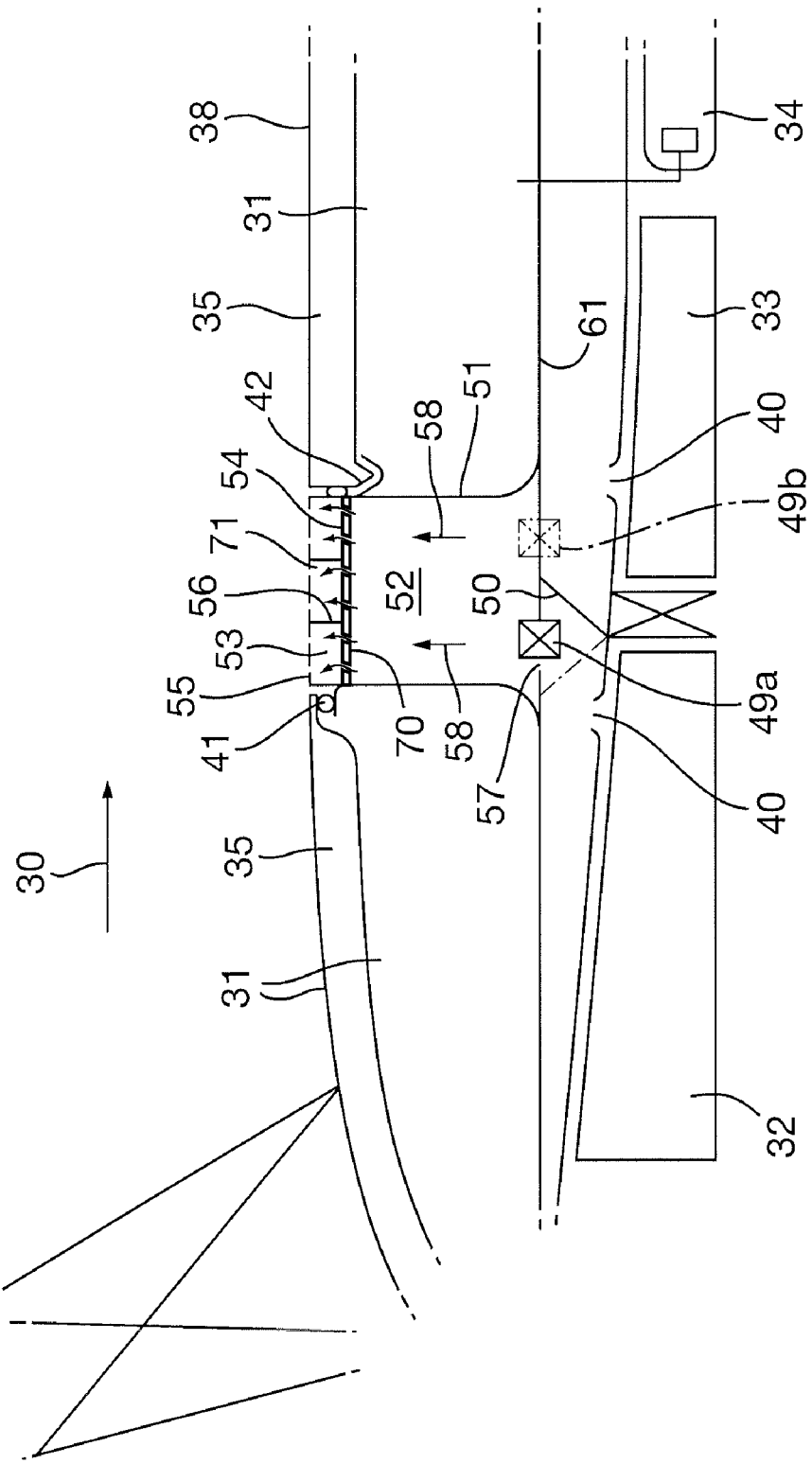
FIG. 3 is a schematic cross section of an acoustic apparatus in accordance with aspects of the present invention; and, FIG. 4 is a schematic front view of an acoustic apparatus in accordance with aspects of the present invention.

Generally, the inner chamber 52 is designed to have sufficient volume that the pressure contained within the chamber 52 is less than half the incident or exit pressure from the valves 49. This reduction in pressure within the inner chamber 52 is sufficient to enable valve 49b from the high pressure compressor 33 to be connected directly to the chamber 52 without segmentation. However, where pressure is too high separation may be provided, although not illustrated in FIG. 3.

The outer chamber 53 generally extends circumferentially over the inner chamber 52 and has an exit surface 55. The chamber surface 55, as indicated, acts as a divider between the chambers 52, 53 and, as will be described later, principally acts with regard to acoustic variation in accordance with aspects of the present invention. The outer chamber 53 may not be segmented but alternatively in order to improve manufacture, and/or optimise the acoustic absorption baffles 56 may be provided to facilitate structural strength and potentially to optimise bleed gas flow through the exit surface 55 and to improve its performance as an acoustic absorber when the bleed valves are shut.

Acoustic control in accordance with aspects of the present invention is by appropriate configuration of the divider chamber surface 54. This surface 54 includes apertures 70 in an appropriate distribution and of an appropriate size to shift, that is to say increase the audible frequency of the gas flow in the direction of arrowheads 58. Typically, the apertures 70 in the divider chamber surface 54 will have a diameter in the order of 0.2-1.2 millimeters with a porosity up to 10% and preferably between 2-4%. In such circumstances in use the high pressure gas flow 58 will pass through the apertures 70 in the divider chamber surface 54 which will act to increase the acoustic frequency of the noise generated by that flow 58 beyond human audible comprehension. Possibly, the apertures 70 in the divider chamber surface 54 may be angled to increase the mixing of the gas flow into the outer chamber 53.

The use of a relatively large number of apertures 70 creates a similar large number of high speed, small jets that generate noise at a high enough frequency that the human ear is insensitive to it and such that these frequencies are more easily absorbed by engine acoustic liners and by the atmosphere as the sound propagates from an engine to a listener. It will also be understood by use of very small diameter apertures 70 with large spacings for the jets, the jets mix out quickly giving a low mean flow speed in the outer chamber 53 and allowing the flow to reach the widest possible area of the exit surface 55 rather than impinging as discrete jets upon that surface 55.

The gas flow into the outer chamber 53 is now able to expand to a much lower pressure such that flows in the outer chamber 53 are generally radial and contiguous. This radial contiguous flow can be sub-divided axially by the baffles 56 which, as can be seen, extend between the surfaces 54, 55 in the outer chamber 53.

The exit surface 55 incorporates large diameter holes 71 or in an opening such that the gas flow in the outer chamber 55 reaches the widest possible area of the exit surface 55 and that gas then flows out of the exit surface 55 through relatively large diameter holes 71 at a low speed generating limited or insignificant noise levels.

It will be appreciated that the outer chamber due a compartmentalised design function acts as a general noise acoustic absorber. Sound waves entering through the outer exit plate 55 enter the outer chamber 53 and cause resonance in that chamber 53 which converts the sound energy into heat. It will be appreciated the effective frequencies of the acoustic absorption are controlled by the diameter and porosity of the apertures in the exit surface and the distance between the surfaces 54, 55. This performance in the outer chamber 53 will also be varied by segmenting the chamber circumferentially with baffles 56 which run radially at spatially displaced positions within the chamber. Such acoustic resonance attenuation will remain active even when there is no gas flow 58 through the valves 49, the normal state. Thus, the baffles 56 acting as actual sub-divisions of the outer chamber 53 minimise the performance losses in conditions where there is a pressure gradient between the front and rear parts of the arrangement, that is to say across the duct trough 51.

Figure 4:
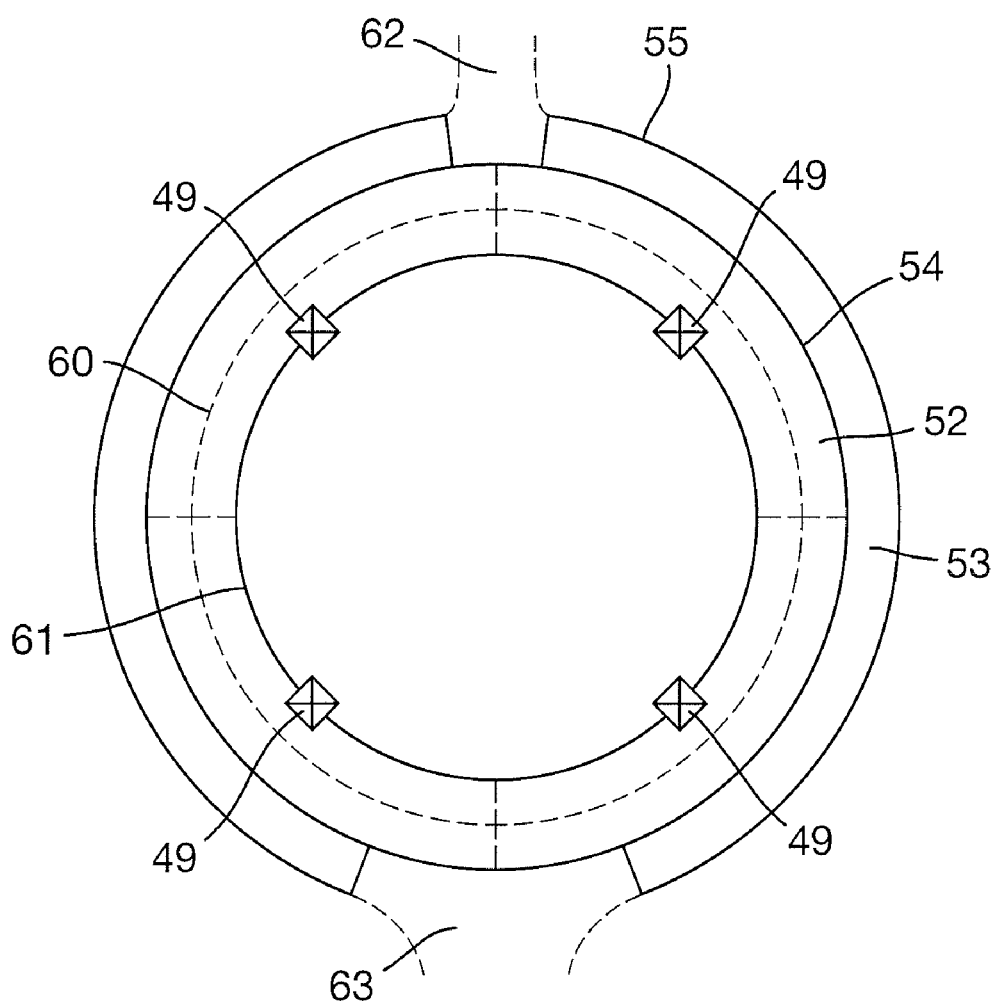

As illustrated in FIG. 4 it is possible to provide a further surface in the form of a baffle 60 in order to create effectively a third chamber to provide better acoustic performance. This additional surface 60 can be considered a sub-division of either the outer or inner chambers but in the embodiment depicted in FIG. 4 the additional surface 60 is orientated to divide the inner chamber 52.

Within an engine core including the compressors 32, 33 the gas flow compressed air is routed into apertures formed in the base of the troughs 51. The valves 49 are mounted and secured in these apertures in order to provide sources of high gas flow when opened. The sides of the trough 51 extend up through the fairing 31 such that the valves 49 are located in a lower surface of the trough 51 whilst the exit surface 55 is substantially contiguous with the fairing 31 at the outer surface 38. In such circumstances, as depicted in FIG. 4, it will be appreciated that the acoustic apparatus in accordance with aspects of the present invention comprises chambers 52, 53 which extend substantially continuously between mounting positions 62, 63 for an engine in accordance with aspects of the present invention. In such circumstances there is a much larger area for acoustically treating the bleed flows through the valves 49. The sides of the trough and position are such that the forward radial wall will provide support for the forward inner bypass wall structure and the rear radial wall forms the support for the rear structure thus simplifying the engine configuration compared to previous constructions requiring several zones.

In view of the above, it will be appreciated that the necessary relatively high pressure gas flows presented through sources such as opening a valve to maintain surge margin in a gas turbine engine can be accommodated. It will be appreciated that the high pressure and therefore high speed flows through the valves create noise characteristics which may be unacceptable and also should the high pressure gas flow impinge upon parts of the bypass duct damage may occur. In such circumstances by aspects of the present invention a duct in the form of a trough is integrally provided within a casing. The top end incorporates an acoustic treatment in the form of a divider chamber surface and an exit surface to attenuate noise created by gas flow through the source, that is to say the valve. By ensuring that the pressure within the inner chamber is sufficiently low, it is possible for the gas flows from the high pressure and intermediate pressure sources to enter a common chamber, that is to say the inner chamber.

In terms of acoustic treatment it is the outer parts of the duct or trough which provide a shift in frequency beyond human audible comprehension. The chamber divide surface is perforated with small holes with wide spacings such that fine discrete jets are created which cannot coalesce but are subject to a big pressure drop in the outer chamber. In such circumstances there are a large number of discreet fine jets which create a high frequency noise inaudible to the human ear. The outer chamber itself has relatively large apertures and the fine jets from the chamber divider surface may be angled such that the non impinging fine jets extend into the outer chamber before exiting with a low pressure through the wide open apertures of the exit surface.

By provision of circumferential baffles, that is to say radially extending collars between the chamber divider surface and exit surface, it is possible to create an acoustic attenuator with regard to normal bypass flow. It will be appreciated in a steady state all the valves will be closed. In such circumstances, the bypass flow will leak through the exit apertures in the exit surface into the outer chamber which has a size and spacing between the chamber divider surface and the exit surface along with provision of the baffles such that a resonant frequency will be generated to provide noise attenuation with regard to the bypass flow.

Although it is preferred to have high pressure and intermediate pressure valves exiting into a common inner chamber it will also be understood where the flow rates from the respective valves is too great, a split or segmentation between ducting or within a duct trough to provide side by side chambers can be achieved by an appropriately constructed trough. Each duct trough will provide a duct in accordance with aspects of the present invention.

It will be appreciated that the configuration in terms of the size of the chambers, the relative size of the chambers, the position of the gas flow source valves relative to the chamber divider surface and between the chamber divider surface and the exit surface, along with the size and distribution of the apertures in the respective chamber divider and exit surfaces will all be chosen dependent upon particular operational requirements, that is to say acoustic response. It will be appreciated by providing the chamber divider plate with its apertures closer to the source valve the pressure drop will occur sooner which in turn will reduce temperature and so loading upon chamber walls. Furthermore, by positioning the exit gas flows further upstream the mixing length increases and therefore temperature and pressure is reduced in that there is more time to mix with the cooler bypass air presented within an engine.

Aspects of the present invention achieve improved silencing in terms of acoustic shift with regard to particularly bleed valve operation in gas turbine engines. This improved acoustic shift is achieved through increasing attenuation area by having an inner porous structure (the divider chamber surface) allowing for a characteristic frequency up shift by reduction in hole diameter whilst increasing hole spacing. In such circumstances, the acoustic frequency is beyond human comprehension. The acoustic response shift is further improved by the presence of a second porous structure allowing low speed final exit velocity to be achieved through the exit surface and a further reduction in flow pressure. Furthermore, the acoustic apparatus provides a general noise attenuator for bypass flow at a steady state, that is to say when bypass valves are not opened.

It will also be understood the present acoustic apparatus through its generally preferred integration within the casing will normally reduce parts count and cost/weight with respect to installation. It will also be understood by reducing the porosity of the inner chamber divider surface it is less prone to fatigue failures and avoidance of dependence on a single porous structure as with previous arrangements. As it is preferred that the present acoustic apparatus is integral it will be understood that there is no requirement for apertures in the nacelle structure itself therefore improving its structural integrity. It will also be understood that there is a reduction in engine to nacelle to engine interfaces due to elimination of dedicated ducting for each bleed valve. Achievement of lower external flow temperatures as a result of increased gas flow mixing in the duct trough and an improved diffusion area will further improve component longevity. Further benefits are provided by integration so eliminating the necessity for certifying separate parts and reducing aerodynamic losses through elimination of steps and gaps in the overall configuration. It will also be understood provision of a trough will provide structural stiffness and therefore improve load sharing within the nacelle of an engine.

Although described principally with regard to gas valves in a gas turbine engine it will be appreciated that aspects of the present invention may also be utilised in situations where there is ejection of a high pressure air flow and requirements for noise attenuation. By provision of an integral duct with two chambers or a chamber with a dual skinned, variable velocity exit it will be understood that the frequency of the flow can be shifted to a level generally inaudible to the human ear. The inner chamber in accordance with aspects of the present invention provides a pressure drop with regard to the gas flow source but even so the provision of small apertures with a wide spacing results in fine gas flow jets which will increase their audible noise frequency whilst causing a pressure reduction in the outer chamber and centrifugal motion within the chamber further enhanced by angular presentation of the apertures. In such circumstances noise created by the relatively high pressure gas flow through the gas flow originators such as opening a bleed valve will be reduced.

Alterations and modifications to aspects of the present invention will be appreciated by those skilled in the art. Thus, for example the size and distribution of the apertures particularly in the chamber divider surface may be adjusted to achieve desired higher frequency shift. The apertures may be angled or shaped and designed to taper in order to further project fine gas flow jets which will not impinge upon each other but will be dispersed in the outer chamber further reducing noise problems.

What is claimed is:

1. A gas turbine engine comprising
   a rotational axis,
   a first compressor having a casing,
   a trough that extends for an arc about the circumference of the casing, and
   a valve located on the casing to regulate a gas flow from the first compressor into and through the trough,
     the trough including a first porous plate and a second porous plate and an inner chamber defined radially inwardly of the first porous plate and an outer chamber defined between the first and second porous plates.

2. A gas turbine engine as claimed in claim 1 wherein the trough is integral to the casing.

3. A gas turbine engine as claimed in claim 1 wherein the engine comprises a second compressor surrounded by the casing and a second valve located on the casing to regulate a second gas flow from the second compressor into the trough.

4. A gas turbine engine as claimed in claim 3 wherein the trough comprises a diaphragm to separate the first and second gas flows.

5. A gas turbine engine as claimed in claim 1 wherein the engine comprises mounting positions and the trough extends between the mounting positions.

6. A gas turbine engine as claimed in claim 1 wherein the outer chamber is segmented axially and / or circumferential by a baffle.

7. A gas turbine engine as claimed in claim 1 wherein there is a further chamber between the inner and outer chambers defined by a surface.

8. A gas turbine engine as claimed in claim 1 wherein the engine comprises a fairing that surrounds the casing, the trough extending between the fairing and the casing.

9. A gas turbine engine comprising
   a first compressor having a casing defining a rotational axis,
   a trough that extends for an arc about the circumference of the casing, the trough including a first porous plate and a second porous plate and an inner chamber defined radially inwardly of the first porous plate and an outer chamber defined between the first and second porous plates, and
   a valve located in the casing to regulate a gas flow from the first compressor through the inner chamber and the outer chamber of the trough,
   wherein the second porous plate has a relatively high porosity compared to a relatively low porosity of the first porous plate.

10. A gas turbine engine as claimed in claim 9 wherein the first porous plate has apertures having a size in the range 0.2 -1.2 millimeters.

11. A gas turbine engine as claimed in claim 9 wherein the first porous plate has apertures in a distribution to achieve a porosity of up to 10% by area.

12. A gas turbine engine as claimed in claim 11 wherein the porosity of the first porous plate is 2 to 4% by area.

13. A gas turbine engine comprising
   a first compressor having a casing defining a rotational axis,
   a trough that extends for an arc about the circumference of the casing, the trough including a first porous plate and a second porous plate and an inner chamber defined radially inwardly of the first porous plate and an outer chamber defined between the first and second porous plates, and
   a valve located in the casing to regulate a gas flow from the first compressor through the inner chamber and the outer chamber of the trough,
   wherein the first porous plate has apertures angled to provide dispersion into the outer chamber of gas flow jets formed through the apertures before impingement of the gas flow jets on each other or on the second porous plate.

* * * * *